United States Patent
Shaburova et al.

(10) Patent No.: US 11,443,772 B2
(45) Date of Patent: *Sep. 13, 2022

(54) METHOD FOR TRIGGERING EVENTS IN A VIDEO

(71) Applicant: Snap Inc., Santa Monica, CA (US)

(72) Inventors: Elena Shaburova, Castro Valley, CA (US); Victor Shaburov, Castro Valley, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,812

(22) Filed: Feb. 9, 2021

(65) Prior Publication Data

US 2021/0166732 A1 Jun. 3, 2021

Related U.S. Application Data

(63) Continuation of application No. 16/298,721, filed on Mar. 11, 2019, now Pat. No. 10,950,271, which is a
(Continued)

(51) Int. Cl.
*G11B 27/031* (2006.01)
*G06T 13/40* (2011.01)
(Continued)

(52) U.S. Cl.
CPC .......... *G11B 27/031* (2013.01); *G06F 3/011* (2013.01); *G06N 20/00* (2019.01); *G06T 5/005* (2013.01);
(Continued)

(58) Field of Classification Search
CPC ....... G11B 27/031; G06T 7/246; G06T 7/251; G06T 7/33; G06T 7/90; G06T 5/005;
(Continued)

(56) References Cited

U.S. PATENT DOCUMENTS

| 4,888,713 A | 12/1989 | Falk |
| 5,359,706 A | 10/1994 | Sterling |

(Continued)

FOREIGN PATENT DOCUMENTS

| CA | 2887596 A1 | 7/2015 |
| CN | 109863532 | 6/2019 |

(Continued)

OTHER PUBLICATIONS

"U.S. Appl. No. 14/314,312, Response filed Oct. 5, 2016 to Final Office Action dated May 5, 2016", 14 pgs.
(Continued)

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

A computer implemented method of triggering events in a video, the method comprising: providing a list of objects with their states and corresponding events in video such that each state from the list triggers at least one event of the corresponding events, wherein each object from the list has at least one state triggering at least one event of the corresponding events from the list in video; detecting at least one object from the list that at least partially and at least occasionally is presented in frames of the video; tracking the at least one object and its state; triggering at least one event of the corresponding events from the list in video in case the state of the at least one object matches with one of its states from the list.

20 Claims, 8 Drawing Sheets

Related U.S. Application Data continuation of application No. 14/314,343, filed on Jun. 25, 2014, now Pat. No. 10,283,162.

(60) Provisional application No. 61/936,016, filed on Feb. 5, 2014.

(51) Int. Cl.

| | | |
|---|---|---|
| *G06T 17/20* | (2006.01) | |
| *G06T 19/20* | (2011.01) | |
| *G06T 7/33* | (2017.01) | |
| *G06T 7/246* | (2017.01) | |
| *G06T 7/90* | (2017.01) | |
| *G06N 20/00* | (2019.01) | |
| *G06V 10/40* | (2022.01) | |
| *G06V 10/42* | (2022.01) | |
| *G06V 10/56* | (2022.01) | |
| *G06V 10/60* | (2022.01) | |
| *G06V 20/40* | (2022.01) | |
| *G06V 40/20* | (2022.01) | |
| *H04N 9/79* | (2006.01) | |
| *G06V 40/16* | (2022.01) | |
| *G06F 3/01* | (2006.01) | |
| *G06T 5/00* | (2006.01) | |
| *G06T 11/00* | (2006.01) | |
| *G06T 11/60* | (2006.01) | |
| *H04N 5/262* | (2006.01) | |
| *G06V 10/46* | (2022.01) | |

(52) U.S. Cl.
CPC .............. *G06T 7/246* (2017.01); *G06T 7/251* (2017.01); *G06T 7/33* (2017.01); *G06T 7/90* (2017.01); *G06T 11/001* (2013.01); *G06T 11/60* (2013.01); *G06T 13/40* (2013.01); *G06T 17/20* (2013.01); *G06T 19/20* (2013.01); *G06V 10/40* (2022.01); *G06V 10/42* (2022.01); *G06V 10/56* (2022.01); *G06V 10/60* (2022.01); *G06V 20/40* (2022.01); *G06V 20/46* (2022.01); *G06V 40/167* (2022.01); *G06V 40/168* (2022.01); *G06V 40/171* (2022.01); *G06V 40/174* (2022.01); *G06V 40/20* (2022.01); *H04N 5/262* (2013.01); *H04N 9/79* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01); *G06V 10/467* (2022.01)

(58) Field of Classification Search
CPC ....... G06T 11/001; G06T 11/60; G06T 13/40; G06T 19/20; G06T 2207/10016; G06T 2207/10021; G06T 2207/30201; G06F 3/011; G06K 9/00261; G06K 9/00268; G06K 9/00281; G06K 9/00302; G06K 9/00335; G06K 9/00711; G06K 9/00744; G06K 9/46; G06K 9/4652; H04N 5/262; H04N 9/79
See application file for complete search history.

(56) References Cited

U.S. PATENT DOCUMENTS

| | | | |
|---|---|---|---|
| 5,479,603 A | 12/1995 | Stone et al. | |
| 5,880,731 A | 3/1999 | Liles et al. | |
| 5,990,973 A | 11/1999 | Sakamoto | |
| 6,016,150 A | 1/2000 | Lengyel et al. | |
| 6,023,270 A | 2/2000 | Brush, II et al. | |
| 6,038,295 A | 3/2000 | Mattes | |
| 6,223,165 B1 | 4/2001 | Lauffer | |
| 6,252,576 B1 | 6/2001 | Nottingham | |
| 6,278,491 B1 | 8/2001 | Wang et al. | |
| H2003 H | 11/2001 | Minner | |
| 6,492,986 B1 | 12/2002 | Metaxas et al. | |
| 6,621,939 B1 | 9/2003 | Negishi et al. | |
| 6,768,486 B1 | 7/2004 | Szabo et al. | |
| 6,771,303 B2 | 8/2004 | Zhang et al. | |
| 6,772,195 B1 | 8/2004 | Hatlelid et al. | |
| 6,806,898 B1 | 10/2004 | Toyama et al. | |
| 6,807,290 B2 | 10/2004 | Liu et al. | |
| 6,842,779 B1 | 1/2005 | Nishizawa | |
| 6,891,549 B2 | 5/2005 | Gold | |
| 6,897,977 B1 | 5/2005 | Bright | |
| 6,980,909 B2 | 12/2005 | Root et al. | |
| 7,034,820 B2 | 4/2006 | Urisaka et al. | |
| 7,039,222 B2 | 5/2006 | Simon et al. | |
| 7,050,078 B2 | 5/2006 | Dempski | |
| 7,119,817 B1 | 10/2006 | Kawakami | |
| 7,167,519 B2 | 1/2007 | Comaniciu et al. | |
| 7,173,651 B1 | 2/2007 | Knowles | |
| 7,212,656 B2 | 5/2007 | Liu et al. | |
| 7,227,567 B1 | 6/2007 | Beck et al. | |
| 7,239,312 B2 | 7/2007 | Urisaka et al. | |
| 7,342,587 B2 | 3/2008 | Danzig et al. | |
| 7,411,493 B2 | 8/2008 | Smith | |
| 7,415,140 B2 | 8/2008 | Nagahashi et al. | |
| 7,468,729 B1 | 12/2008 | Levinson | |
| 7,535,890 B2 | 5/2009 | Rojas | |
| 7,538,764 B2 | 5/2009 | Salomie | |
| 7,564,476 B1 | 7/2009 | Coughlan et al. | |
| 7,636,755 B2 | 12/2009 | Blattner et al. | |
| 7,639,251 B2 | 12/2009 | Gu et al. | |
| 7,671,318 B1 | 3/2010 | Tener et al. | |
| 7,697,787 B2 | 4/2010 | Ilisley | |
| 7,710,608 B2 | 5/2010 | Takahashi | |
| 7,775,885 B2 | 8/2010 | Van et al. | |
| 7,782,506 B2 | 8/2010 | Suzuki et al. | |
| 7,812,993 B2 | 10/2010 | Bright | |
| 7,830,384 B1 | 11/2010 | Edwards et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 7,945,653 B2 | 5/2011 | Zuckerberg et al. | |
| 7,971,156 B2 | 6/2011 | Albertson et al. | |
| 8,026,931 B2 | 9/2011 | Sun et al. | |
| 8,086,060 B1 | 12/2011 | Gilra et al. | |
| 8,088,044 B2 | 1/2012 | Tchao et al. | |
| 8,090,160 B2 | 1/2012 | Kakadiaris et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,131,597 B2 | 3/2012 | Hudetz | |
| 8,146,005 B2 | 3/2012 | Jones et al. | |
| 8,151,191 B2 | 4/2012 | Nicol | |
| 8,199,747 B2 | 6/2012 | Rojas et al. | |
| 8,230,355 B1 | 7/2012 | Bauermeister et al. | |
| 8,253,789 B2 | 8/2012 | Aizaki et al. | |
| 8,295,557 B2 | 10/2012 | Wang et al. | |
| 8,296,456 B2 | 10/2012 | Klappert | |
| 8,314,842 B2 | 11/2012 | Kudo | |
| 8,332,475 B2 | 12/2012 | Rosen et al. | |
| 8,335,399 B2 | 12/2012 | Gyotoku | |
| 8,384,719 B2 | 2/2013 | Reville et al. | |
| 8,385,684 B2 | 2/2013 | Sandrew et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,520,093 B2 | 8/2013 | Nanu et al. | |
| 8,559,980 B2 | 10/2013 | Pujol | |
| 8,564,621 B2 | 10/2013 | Branson et al. | |
| 8,564,710 B2 | 10/2013 | Nonaka et al. | |

(56) References Cited

U.S. PATENT DOCUMENTS

| | | |
|---|---|---|
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,675,972 B2 | 3/2014 | Lefevre et al. |
| 8,683,354 B2 | 3/2014 | Khandelwal et al. |
| 8,692,830 B2 | 4/2014 | Nelson et al. |
| 8,717,465 B2 | 5/2014 | Ning |
| 8,718,333 B2 | 5/2014 | Wolf et al. |
| 8,724,622 B2 | 5/2014 | Rojas |
| 8,743,210 B2 | 6/2014 | Lin |
| 8,761,497 B2 | 6/2014 | Berkovich et al. |
| 8,766,983 B2 | 7/2014 | Marks et al. |
| 8,810,513 B2 | 8/2014 | Ptucha et al. |
| 8,810,696 B2 | 8/2014 | Ning |
| 8,812,171 B2 | 8/2014 | Filev et al. |
| 8,823,769 B2 | 9/2014 | Sekine |
| 8,824,782 B2 | 9/2014 | Ichihashi et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,897,596 B1 | 11/2014 | Passmore et al. |
| 8,909,679 B2 | 12/2014 | Root et al. |
| 8,924,250 B2 | 12/2014 | Bates et al. |
| 8,929,614 B2 | 1/2015 | Oicherman et al. |
| 8,934,665 B2 | 1/2015 | Kim et al. |
| 8,958,613 B2 | 2/2015 | Kondo et al. |
| 8,963,926 B2 | 2/2015 | Brown et al. |
| 8,976,862 B2 | 3/2015 | Kim et al. |
| 8,989,786 B2 | 3/2015 | Feghali |
| 8,995,433 B2 | 3/2015 | Rojas |
| 9,032,314 B2 | 5/2015 | Mital et al. |
| 9,040,574 B2 | 5/2015 | Wang et al. |
| 9,055,416 B2 | 6/2015 | Rosen et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,191,776 B2 | 11/2015 | Root et al. |
| 9,204,252 B2 | 12/2015 | Root et al. |
| 9,225,897 B1 | 12/2015 | Sehn et al. |
| 9,232,189 B2 | 1/2016 | Shaburov et al. |
| 9,241,184 B2 | 1/2016 | Weerasinghe |
| 9,256,860 B2 | 2/2016 | Herger et al. |
| 9,276,886 B1 | 3/2016 | Samaranayake |
| 9,298,257 B2 | 3/2016 | Hwang et al. |
| 9,311,534 B2 | 4/2016 | Liang |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,364,147 B2 | 6/2016 | Wakizaka et al. |
| 9,378,576 B2 | 6/2016 | Bouaziz et al. |
| 9,396,525 B2 | 7/2016 | Shaburova et al. |
| 9,402,057 B2 | 7/2016 | Kaytaz et al. |
| 9,412,007 B2 | 8/2016 | Nanu et al. |
| 9,412,192 B2 | 8/2016 | Mandel et al. |
| 9,443,227 B2 | 9/2016 | Evans et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,565,362 B2 | 2/2017 | Kudo |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,848,293 B2 | 12/2017 | Murray et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,928,874 B2 | 3/2018 | Shaburova |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,102,423 B2 | 10/2018 | Shaburov et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,255,948 B2 | 4/2019 | Shaburova et al. |
| 10,262,250 B1 | 4/2019 | Spiegel et al. |
| 10,271,010 B2 | 4/2019 | Gottlieb |
| 10,283,162 B2 | 5/2019 | Shaburova et al. |
| 10,284,508 B1 | 5/2019 | Allen et al. |
| 10,362,219 B2 | 7/2019 | Wilson et al. |
| 10,438,631 B2 | 10/2019 | Shaburova et al. |
| 10,439,972 B1 | 10/2019 | Spiegel et al. |
| 10,475,225 B2 | 11/2019 | Park et al. |
| 10,504,266 B2 | 12/2019 | Blattner et al. |
| 10,509,466 B1 | 12/2019 | Miller et al. |
| 10,514,876 B2 | 12/2019 | Sehn |
| 10,566,026 B1 | 2/2020 | Shaburova |
| 10,573,048 B2 | 2/2020 | Ni et al. |
| 10,586,570 B2 | 3/2020 | Shaburova et al. |
| 10,614,855 B2 | 4/2020 | Huang |
| 10,657,701 B2 | 5/2020 | Osman et al. |
| 10,748,347 B1 | 8/2020 | Li et al. |
| 10,950,271 B1 | 3/2021 | Shaburova et al. |
| 10,958,608 B1 | 3/2021 | Allen et al. |
| 10,962,809 B1 | 3/2021 | Castañeda |
| 10,991,395 B1 | 4/2021 | Shaburova et al. |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2001/0004417 A1 | 6/2001 | Narutoshi et al. |
| 2002/0012454 A1 | 1/2002 | Liu et al. |
| 2002/0067362 A1 | 6/2002 | Agostino Nocera et al. |
| 2002/0163516 A1 | 11/2002 | Hubbell |
| 2002/0169644 A1 | 11/2002 | Greene |
| 2003/0107568 A1 | 6/2003 | Urisaka et al. |
| 2003/0132946 A1 | 7/2003 | Gold |
| 2003/0228135 A1 | 12/2003 | Ilisley |
| 2004/0076337 A1 | 4/2004 | Nishida |
| 2004/0119662 A1 | 6/2004 | Dempski |
| 2004/0130631 A1 | 7/2004 | Suh |
| 2004/0233223 A1 | 11/2004 | Schkolne et al. |
| 2005/0046905 A1 | 3/2005 | Aizaki et al. |
| 2005/0117798 A1 | 6/2005 | Patton et al. |
| 2005/0128211 A1 | 6/2005 | Berger et al. |
| 2005/0162419 A1 | 7/2005 | Kim et al. |
| 2005/0180612 A1 | 8/2005 | Nagahashi et al. |
| 2005/0190980 A1 | 9/2005 | Bright |

(56) References Cited

U.S. PATENT DOCUMENTS

| | | |
|---|---|---|
| 2005/0202440 A1 | 9/2005 | Fletterick et al. |
| 2005/0206610 A1 | 9/2005 | Cordelli |
| 2005/0220346 A1 | 10/2005 | Akahori |
| 2005/0238217 A1 | 10/2005 | Enomoto et al. |
| 2006/0098248 A1 | 5/2006 | Suzuki et al. |
| 2006/0110004 A1 | 5/2006 | Wu et al. |
| 2006/0170937 A1 | 8/2006 | Takahashi |
| 2006/0227997 A1* | 10/2006 | Au .................. G08B 13/19682 382/103 |
| 2006/0242183 A1 | 10/2006 | Niyogi et al. |
| 2006/0269128 A1 | 11/2006 | Vladislav |
| 2006/0290695 A1 | 12/2006 | Salomie |
| 2006/0294465 A1 | 12/2006 | Ronen et al. |
| 2007/0013709 A1 | 1/2007 | Charles et al. |
| 2007/0087352 A9 | 4/2007 | Fletterick et al. |
| 2007/0113181 A1 | 5/2007 | Blattner et al. |
| 2007/0140556 A1 | 6/2007 | Willamowski et al. |
| 2007/0159551 A1 | 7/2007 | Kotani |
| 2007/0168863 A1 | 7/2007 | Blattner et al. |
| 2007/0176921 A1 | 8/2007 | Iwasaki et al. |
| 2007/0216675 A1 | 9/2007 | Sun et al. |
| 2007/0223830 A1 | 9/2007 | Ono |
| 2007/0258656 A1 | 11/2007 | Aarabi et al. |
| 2007/0268312 A1 | 11/2007 | Marks et al. |
| 2008/0063285 A1 | 3/2008 | Porikli et al. |
| 2008/0158222 A1 | 7/2008 | Li et al. |
| 2008/0184153 A1 | 7/2008 | Matsumura et al. |
| 2008/0187175 A1 | 8/2008 | Kim et al. |
| 2008/0204992 A1 | 8/2008 | Swenson et al. |
| 2008/0212894 A1 | 9/2008 | Demirli et al. |
| 2009/0016617 A1 | 1/2009 | Bregman-amitai et al. |
| 2009/0027732 A1 | 1/2009 | Imai |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0290791 A1 | 11/2009 | Holub et al. |
| 2009/0300525 A1 | 12/2009 | Jolliff et al. |
| 2009/0303984 A1 | 12/2009 | Clark et al. |
| 2009/0310828 A1 | 12/2009 | Kakadiaris et al. |
| 2010/0011422 A1 | 1/2010 | Mason et al. |
| 2010/0023885 A1 | 1/2010 | Reville et al. |
| 2010/0074475 A1 | 3/2010 | Chouno |
| 2010/0115426 A1 | 5/2010 | Liu et al. |
| 2010/0162149 A1 | 6/2010 | Sheleheda et al. |
| 2010/0177981 A1 | 7/2010 | Wang et al. |
| 2010/0185963 A1 | 7/2010 | Slik et al. |
| 2010/0188497 A1 | 7/2010 | Aizaki et al. |
| 2010/0202697 A1 | 8/2010 | Matsuzaka et al. |
| 2010/0203968 A1 | 8/2010 | Gill et al. |
| 2010/0227682 A1 | 9/2010 | Reville et al. |
| 2010/0231590 A1 | 9/2010 | Erceis et al. |
| 2010/0316281 A1 | 12/2010 | Lefevre |
| 2011/0018875 A1 | 1/2011 | Arahari et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0182357 A1 | 7/2011 | Kim et al. |
| 2011/0202598 A1 | 8/2011 | Evans et al. |
| 2011/0239136 A1 | 9/2011 | Goldman et al. |
| 2011/0261050 A1 | 10/2011 | Smolic et al. |
| 2011/0273620 A1 | 11/2011 | Berkovich et al. |
| 2012/0106806 A1* | 5/2012 | Folta .................. G06K 9/00295 382/118 |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0136668 A1 | 5/2012 | Kuroda et al. |
| 2012/0144325 A1 | 6/2012 | Mital et al. |
| 2012/0167146 A1 | 6/2012 | Incorvia |
| 2012/0209924 A1 | 8/2012 | Evans et al. |
| 2012/0288187 A1 | 11/2012 | Ichihashi et al. |
| 2012/0306853 A1 | 12/2012 | Wright et al. |
| 2013/0004096 A1 | 1/2013 | Goh et al. |
| 2013/0103760 A1 | 4/2013 | Golding et al. |
| 2013/0114867 A1 | 5/2013 | Kondo et al. |
| 2013/0190577 A1 | 7/2013 | Brunner et al. |
| 2013/0201105 A1* | 8/2013 | Ptucha .................. G06F 3/017 345/158 |
| 2013/0201187 A1* | 8/2013 | Tong .................. G06K 9/6255 345/420 |
| 2013/0201328 A1 | 8/2013 | Chung |
| 2013/0208129 A1 | 8/2013 | Stenman |
| 2013/0216094 A1 | 8/2013 | Delean |
| 2013/0229409 A1 | 9/2013 | Song et al. |
| 2013/0235086 A1 | 9/2013 | Otake |
| 2013/0249948 A1 | 9/2013 | Reitan |
| 2013/0257877 A1 | 10/2013 | Davis |
| 2013/0278600 A1 | 10/2013 | Christensen et al. |
| 2013/0287291 A1 | 10/2013 | Cho |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0179347 A1 | 6/2014 | Murray et al. |
| 2014/0198177 A1 | 7/2014 | Castellani et al. |
| 2014/0228668 A1 | 8/2014 | Wakizaka et al. |
| 2015/0055829 A1 | 2/2015 | Liang |
| 2015/0097834 A1 | 4/2015 | Ma et al. |
| 2015/0116350 A1 | 4/2015 | Lin et al. |
| 2015/0116448 A1 | 4/2015 | Gottlieb |
| 2015/0131924 A1 | 5/2015 | He et al. |
| 2015/0145992 A1 | 5/2015 | Traff |
| 2015/0163416 A1* | 6/2015 | Nevatie .................. H04N 5/272 348/239 |
| 2015/0195491 A1 | 7/2015 | Shaburov et al. |
| 2015/0206349 A1 | 7/2015 | Rosenthal et al. |
| 2015/0213604 A1 | 7/2015 | Li et al. |
| 2015/0220252 A1 | 8/2015 | Mital et al. |
| 2015/0221069 A1 | 8/2015 | Shaburova et al. |
| 2015/0221118 A1 | 8/2015 | Shaburova |
| 2015/0221136 A1 | 8/2015 | Shaburova et al. |
| 2015/0221338 A1 | 8/2015 | Shaburova et al. |
| 2015/0222821 A1 | 8/2015 | Shaburova |
| 2016/0012627 A1 | 1/2016 | Kishikawa et al. |
| 2016/0134840 A1 | 5/2016 | Mcculloch |
| 2016/0234149 A1 | 8/2016 | Tsuda et al. |
| 2016/0253550 A1 | 9/2016 | Zhang et al. |
| 2016/0322079 A1 | 11/2016 | Shaburova et al. |
| 2017/0080346 A1 | 3/2017 | Abbas |
| 2017/0087473 A1 | 3/2017 | Siegel et al. |
| 2017/0098122 A1 | 4/2017 | El Kaliouby et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0364810 A1* | 12/2018 | Parshionikar .......... G06F 3/012 |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2020/0160886 A1 | 5/2020 | Shaburova |
| 2021/0011612 A1 | 1/2021 | Dancie et al. |
| 2021/0074016 A1 | 3/2021 | Li et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |

(56) References Cited

U.S. PATENT DOCUMENTS

2021/0382564 A1 12/2021 Blachly et al.
2021/0397000 A1 12/2021 Rodriguez, II

FOREIGN PATENT DOCUMENTS

| | | |
|---|---|---|
| CN | 110168478 | 8/2019 |
| EP | 2184092 | 5/2010 |
| JP | 2001230801 | 8/2001 |
| JP | 5497931 | 3/2014 |
| KR | 100853122 B1 | 8/2008 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"U.S. Appl. No. 14/314,312, Advisory Action dated May 10, 2019", 3 pgs.
"U.S. Appl. No. 14/314,312, Appeal Brief filed Oct. 3, 2019", 14 pgs.
"U.S. Appl. No. 14/314,312, Final Office Action dated Mar. 22, 2019", 28 pgs.
"U.S. Appl. No. 14/314,312, Final Office Action dated Apr. 12, 2017", 34 pgs.
"U.S. Appl. No. 14/314,312, Final Office Action dated May 5, 2016", 28 pgs.
"U.S. Appl. No. 14/314,312, Final Office Action dated May 10, 2018", 32 pgs.
"U.S. Appl. No. 14/314,312, Non Final Office Action dated Jul. 5, 2019", 25 pgs.
"U.S. Appl. No. 14/314,312, Non Final Office Action dated Aug. 30, 2017", 32 pgs.
"U.S. Appl. No. 14/314,312, Non Final Office Action dated Oct. 17, 2016", 33 pgs.
"U.S. Appl. No. 14/314,312, Non Final Office Action dated Nov. 5, 2015", 26 pgs.
"U.S. Appl. No. 14/314,312, Non Final Office Action dated Nov. 27, 2018", 29 pgs.
"U.S. Appl. No. 14/314,312, Notice of Allowance dated Oct. 25, 2019", 9 pgs.
"U.S. Appl. No. 14/314,312, Response filed Jan. 28, 2019 to Non Final Office Action dated Nov. 27, 2018", 10 pgs.
"U.S. Appl. No. 14/314,312, Response filed Feb. 28, 2018 to Non Final Office Action dated Aug. 30, 2017", 13 pgs.
"U.S. Appl. No. 14/314,312, Response filed Mar. 17, 2017 to Non Final Office Action dated Oct. 17, 2016", 12 pgs.
"U.S. Appl. No. 14/314,312, Response filed Apr. 5, 2016 to Non Final Office Action dated Nov. 5, 2015", 13 pgs.
"U.S. Appl. No. 14/314,312, Response filed Aug. 14, 2017 to Final Office Action dated Apr. 12, 2017", 16 pgs.
"U.S. Appl. No. 14/314,312, Response filed Sep. 6, 2018 to Final Office Action dated May 10, 2018", 12 pgs.
"U.S. Appl. No. 14/314,312, Response filed Oct. 5, 2016 to Final Office Action dated May 5, 2016", 12 pgs.
"U.S. Appl. No. 14/314,312, Response filed May 3, 2019 to Final Office Action dated Mar. 22, 2019", 11 pgs.
"U.S. Appl. No. 14/314,324, Advisory Action dated Sep. 21, 2017", 4 pgs.
"U.S. Appl. No. 14/314,324, Final Office Action dated May 3, 2017", 33 pgs.
"U.S. Appl. No. 14/314,324, Final Office Action dated May 5, 2016", 24 pgs.
"U.S. Appl. No. 14/314,324, Non Final Office Action dated Oct. 14, 2016", 26 pgs.
"U.S. Appl. No. 14/314,324, Non Final Office Action dated Nov. 5, 2015", 23 pgs.
"U.S. Appl. No. 14/314,324, Notice of Allowance dated Nov. 8, 2017", 7 pgs.
"U.S. Appl. No. 14/314,324, Response filed Feb. 14, 2017 to Non Final Office Action dated Oct. 14, 2016", 19 pgs.
"U.S. Appl. No. 14/314,324, Response filed Apr. 5, 2016 to Non Final Office Action dated Nov. 5, 2015", 15 pgs.
"U.S. Appl. No. 14/314,324, Response filed Sep. 1, 2017 to Final Office Action dated May 3, 2017", 10 pgs.
"U.S. Appl. No. 14/314,324, Response Filed Oct. 5, 2016 to Final Office Action dated May 5, 2016", 14 pgs.
"U.S. Appl. No. 14/314,324, Response filed Nov. 3, 2017 to Advisory Action dated Sep. 21, 2017", 11 pgs.
"U.S. Appl. No. 14/314,334, Appeal Brief filed Apr. 15, 2019", 19 pgs.
"U.S. Appl. No. 14/314,334, Examiner Interview Summary dated Apr. 28, 2017", 3 pgs.
"U.S. Appl. No. 14/314,334, Examiner Interview Summary dated Nov. 26, 2018", 3 pgs.
"U.S. Appl. No. 14/314,334, Final Office Action dated Feb. 15, 2019", 40 pgs.
"U.S. Appl. No. 14/314,334, Final Office Action dated May 16, 2016", 43 pgs.
"U.S. Appl. No. 14/314,334, Final Office Action dated May 31, 2018", 38 pgs.
"U.S. Appl. No. 14/314,334, Final Office Action dated Jul. 12, 2017", 40 pgs.
"U.S. Appl. No. 14/314,334, Non Final Office Action dated Jan. 22, 2018", 35 pgs.
"U.S. Appl. No. 14/314,334, Non Final Office Action dated Oct. 26, 2018", 39 pgs.
"U.S. Appl. No. 14/314,334, Non Final Office Action dated Nov. 13, 2015", 39 pgs.
"U.S. Appl. No. 14/314,334, Non Final Office Action dated Dec. 1, 2016", 45 pgs.
"U.S. Appl. No. 14/314,334, Notice of Allowance dated Jul. 1, 2019", 9 pgs.
"U.S. Appl. No. 14/314,334, Notice of Allowance dated Sep. 19, 2017", 5 pgs.
"U.S. Appl. No. 14/314,334, Response filed Apr. 13, 2016 to Non Final Office Action dated Nov. 13, 2015", 20 pgs.
"U.S. Appl. No. 14/314,334, Response Filed Apr. 23, 2018 to Non Final Office Action dated Jan. 22, 2018", 14 pgs.
"U.S. Appl. No. 14/314,334, Response filed May 20, 2017 to Non Final Office Action dated Dec. 1, 2016", 16 pgs.
"U.S. Appl. No. 14/314,334, Response filed Aug. 30, 2018 to Final Office Action dated May 31, 2018", 13 pgs.
"U.S. Appl. No. 14/314,334, Response filed Sep. 1, 2017 to Final Office Action dated Jul. 12, 2017", 12 pgs.
"U.S. Appl. No. 14/314,334, Response filed Oct. 17, 2016 to Final Office Action dated May 16, 2016", 16 pgs.
"U.S. Appl. No. 14/314,343, Final Office Action dated May 6, 2016", 19 pgs.
"U.S. Appl. No. 14/314,343, Final Office Action dated Aug. 15, 2017", 38 pgs.
"U.S. Appl. No. 14/314,343, Final Office Action dated Sep. 6, 2018", 43 pgs.
"U.S. Appl. No. 14/314,343, Non Final Office Action dated Apr. 19, 2018", 40 pgs.
"U.S. Appl. No. 14/314,343, Non Final Office Action dated Nov. 4, 2015", 14 pgs.
"U.S. Appl. No. 14/314,343, Non Final Office Action dated Nov. 17, 2016", 31 pgs.

(56) References Cited

OTHER PUBLICATIONS

"U.S. Appl. No. 14/314,343, Notice of Allowance dated Dec. 17, 2018", 5 pgs.
"U.S. Appl. No. 14/314,343, Response filed Feb. 15, 2018 to Final Office Action dated Aug. 15, 2017", 11 pgs.
"U.S. Appl. No. 14/314,343, Response filed Apr. 4, 2016 to Non Final Office Action dated Nov. 4, 2015", 10 pgs.
"U.S. Appl. No. 14/314,343, Response filed May 11, 2017 to Non Final Office Action dated Nov. 17, 2016", 13 pgs.
"U.S. Appl. No. 14/314,343, Response filed Jul. 19, 2018 to Non Final Office Action dated Apr. 19, 2018", 15 pgs.
"U.S. Appl. No. 14/314,343, Response filed Oct. 6, 2016 to Final Office Action dated May 6, 2016", 13 pgs.
"U.S. Appl. No. 14/314,343, Response Filed Oct. 11, 2018 to Final Office Action dated Sep. 6, 2018", 11 pgs.
"U.S. Appl. No. 14/325,477, Non Final Office Action dated Oct. 9, 2015", 17 pgs.
"U.S. Appl. No. 14/325,477, Notice of Allowance dated Mar. 17, 2016", 5 pgs.
"U.S. Appl. No. 14/325,477, Response filed Feb. 9, 2016 to Non Final Office Action dated Oct. 9, 2015", 13 pgs.
"U.S. Appl. No. 15/208,973, Final Office Action dated May 10, 2018", 13 pgs.
"U.S. Appl. No. 15/208,973, Non Final Office Action dated Sep. 19, 2017", 17 pgs.
"U.S. Appl. No. 15/208,973, Notice of Allowability dated Feb. 21, 2019", 3 pgs.
"U.S. Appl. No. 15/208,973, Notice of Allowance dated Nov. 20, 2018", 14 pgs.
"U.S. Appl. No. 15/208,973, Preliminary Amendment filed Jan. 17, 2017", 9 pgs.
"U.S. Appl. No. 15/208,973, Response filed Sep. 5, 2018 to Final Office Action dated May 10, 2018", 10 pgs.
"U.S. Appl. No. 16/277,750, Notice of Allowance dated Oct. 2, 2019", 9 pgs.
"U.S. Appl. No. 16/277,750, Non Final Office Action dated Aug. 5, 2020", 8 pgs.
"U.S. Appl. No. 16/277,750, Response filed Nov. 5, 2020 to Non Final Office Action dated Aug. 5, 2020", 27 pgs.
"U.S. Appl. No. 16/298,721, Advisory Action dated May 12, 2020", 3 pgs.
"U.S. Appl. No. 16/298,721, Examiner Interview Summary dated Oct. 20, 2020", 3 pgs.
"U.S. Appl. No. 16/298,721, Final Office Action dated Mar. 6, 2020", 54 pgs.
"U.S. Appl. No. 16/298,721, Non Final Office Action dated Jul. 24, 2020", 80 pgs.
"U.S. Appl. No. 16/298,721, Non Final Office Action dated Oct. 3, 2019", 40 pgs.
"U.S. Appl. No. 16/298,721, Notice of Allowance dated Nov. 10, 2020", 5 pgs.
"U.S. Appl. No. 16/298,721, PTO Response to Rule 312 Communication dated Feb. 4, 2021", 2 pgs.
"U.S. Appl. No. 16/298,721, Response filed Jan. 3, 2020 to Non Final Office Action dated Oct. 3, 2019", 10 pgs.
"U.S. Appl. No. 16/298,721, Response filed Apr. 23, 2020 to Final Office Action dated Mar. 6, 2020", 11 pgs.
"U.S. Appl. No. 16/298,721, Response filed Oct. 22, 2020 to Non Final Office Action dated Jul. 24, 2020", 13 pgs.
"Bilinear interpolation", Wikipedia, [Online] Retrieved from the Internet: <URL: https://web.archive.org/web/20110921104425/http://en.wikipedia.org/wiki/Bilinear_interpolation>, (Jan. 8, 2014), 3 pgs.
"imatest", [Online] Retrieved from the Internet on Jul. 10, 2015: <URL: https://web.archive.org/web/20150710000557/http://www.imatest.com/>, 3 pgs.
"KR 10-0853122 B1 machine translation", IP.com, (2008), 29 pgs.
Ahlberg, Jorgen, "Candide-3: An Updated Parameterised Face", Image Coding Group, Dept. of Electrical Engineering, Linkoping University, SE, (Jan. 2001), 16 pgs.

Baxes, Gregory A., et al., "Digital Image Processing: Principles and Applications, Chapter 4", New York: Wiley, (1994), 88-91.
Chen, et al., "Manipulating, Deforming and Animating Sampled Object Representations", Computer Graphics Forum vol. 26, (2007), 824-852 pgs.
Dornaika, F, et al., "On Appearance Based Face and Facial Action Tracking", IEEE Trans. Circuits Syst. Video Technol. 16(9), (Sep. 2006), 1107-1124.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Milborrow, S, et al., "Locating facial features with an extended active shape model", European Conference on Computer Vision, Springer, Berlin, Heidelberg, [Online] Retrieved from the Internet: <URL: http://www.milbo.org/stasm-files/locating-facial-features-with-an-extended-asm.pdf>, (2008), 11 pgs.
Ohya, Jun, et al., "Virtual Metamorphosis", IEEE MultiMedia, 6(2), (1999), 29-39.
U.S. Appl. No. 14/314,312 U.S. Pat. No. 10,586,570, filed Jun. 25, 2014, Method for Real Time Video Processing for Changing Proportions of an Object in the Video.
U.S. Appl. No. 16/749,708, filed Jan. 22, 2020, Real Time Video Processing for Changing Proprotions of an Object in the Video.
U.S. Appl. No. 14/325,477 U.S. Pat. No. 9,396,525, filed Jul. 8, 2014, Method for Real Time Video Processing Invovling Changing a Color of an Object on a Human Face in a Video.
U.S. Appl. No. 15/208,973 U.S. Pat. No. 10,255,948, filed Jul. 13, 2016, Method for Real Time Video Processing Involving Changing a Color of an Object on a Human Face in a Video.
U.S. Appl. No. 14/314,324 U.S. Pat. No. 9,928,874, filed Jun. 25, 2014, Method for Real-Time Video Processing Involving Changing Features of an Object in the Video.
U.S. Appl. No. 16/277,750, filed Feb. 15, 2019, Method for Real Time Video Processing Involving Changing a Color of an Object on a Human Face in a Video.
U.S. Appl. No. 15/921,282 U.S. Pat. No. 10,566,026, filed Mar. 14, 2018, Method for Real-Time Video Processing Involving Changing Features of an Object in the Video.
U.S. Appl. No. 16/732,858, filed Jan. 2, 2020, Method for Real-Time Video Processing Involving Changing Features of an Object in the Video.
U.S. Appl. No. 14/314,334 U.S. Pat. No. 10,438,631, filed Jun. 25, 2014, Method for Real-Time Video Processing Involving Retouching of an Object in the Video.
U.S. Appl. No. 16/548,279, filed Aug. 22, 2019, Method for Real-Time Video Processing Involving Retouching of an Object in the Video.
U.S. Appl. No. 14/314,343 U.S. Pat. No. 10,283,162, filed Jun. 25, 2014, Method for Triggering Events in a Video.
U.S. Appl. No. 16/298,721, filed Mar. 11, 2019, Method for Triggering Events in a Video.
"U.S. Appl. No. 14/314,312, Notice of Allowability dated Jan. 7, 2020", 3 pgs.
"U.S. Appl. No. 16/277,750, Notice of Allowance dated Nov. 30, 2020", 5 pgs.
"U.S. Appl. No. 16/277,750, Supplemental Notice of Allowability dated Dec. 28, 2020", 2 pgs.
"U.S. Appl. No. 16/548,279, Non Final Office Action dated Mar. 1, 2021", 26 pgs.
"U.S. Appl. No. 16/277,750, PTO Response to Rule 312 Communication dated Mar. 30, 2021", 2 pgs.
"U.S. Appl. No. 16/548,279, Response filed May 5, 2021 to Non Final Office Action dated Mar. 1, 2021", 11 pgs.
"U.S. Appl. No. 16/548,279, Final Office Action dated May 21, 2021", 24 pgs.
"U.S. Appl. No. 16/548,279, Response filed Jul. 16, 2021 to Final Office Action dated May 21, 2021", 10 pgs.
"U.S. Appl. No. 16/732,858, Non Final Office Action dated Jul. 19, 2021", 29 pgs.
"U.S. Appl. No. 16/548,279, Advisory Action dated Jul. 23, 2021", 3 pgs.
"U.S. Appl. No. 16/749,708, Non Final Office Action dated Jul. 30, 2021", 29 pgs.

(56) References Cited

OTHER PUBLICATIONS

"U.S. Appl. No. 16/548,279, Non Final Office Action dated Aug. 4, 2021", 23 pgs.
"U.S. Appl. No. 16/732,858, Response filed Oct. 19, 2021 to Non Final Office Action dated Jul. 19, 2021", 12 pgs.
"U.S. Appl. No. 16/749,708, Response filed Oct. 28, 2021 to Non Final Office Action dated Jul. 30, 2021", 12 pgs.
"U.S. Appl. No. 16/548,279, Response filed Nov. 1, 2021 to Non Final Office Action dated Aug. 4, 2021", 11 pgs.
"U.S. Appl. No. 16/732,858, Final Office Action dated Nov. 4, 2021", 19 pgs.
"U.S. Appl. No. 16/548,279, Final Office Action dated Nov. 12, 2021", 31 pgs.
"U.S. Appl. No. 16/749,708, Final Office Action dated Nov. 15, 2021", 35 pgs.
"U.S. Appl. No. 16/732,858, Response filed Jan. 3, 2022 to Final Office Action dated Nov. 4, 2021", 10 pgs.
"U.S. Appl. No. 16/548,279, Response filed Jan. 5, 2022 to Final Office Action dated Nov. 12, 2021", 12 pgs.
"U.S. Appl. No. 16/749,708, Response filed Jan. 7, 2022 to Final Office Action dated Nov. 15, 2021", 11 pgs.
"U.S. Appl. No. 16/732,858, Advisory Action dated Jan. 12, 2022", 3 pgs.
"U.S. Appl. No. 16/548,279, Advisory Action dated Jan. 13, 2022", 4 pgs.
"U.S. Appl. No. 16/749,708, Notice of Allowance dated Jan. 21, 2022", 13 pgs.
"U.S. Appl. No. 16/732,858, Non Final Office Action dated Feb. 9, 2022", 26 pgs.
"Facial Action Coding System", Wikipedia, [Online], Retrieved from the Internet: <URL: https://en.wikipedia.org/w/index.php?title=Facial_Action_Coding_System&oldid=591978414>, (Jan. 23, 2014), 6 pgs.
"U.S. Appl. No. 16/548,279, Non Final Office Action dated Feb. 17, 2022", 37 pgs.
Baldwin, Bernard, "Resolution-Appropriate Shape Representation", Sixth International Conference on Computer Vision (IEEE Cat No. 98CH36271), (1998), 460-465.
Florenza, Lidia, "Real Time Corner Detection for Miniaturized Electro-Optical Sensors Onboard Small Unmanned Aerial Systems", Sensors, 12(1), (2012), 863-877.
Forlenza, Lidia, "Real Time Corner Detection for Miniaturized Electro-Optical Sensors Onboard Small Unmanned Aerial Systems", Sensors, 12(1), (2012), 863-877.
Kaufmann, Peter, "Finite Element Image Warping", Computer Graphics Forum, vol. 32, No. 2-1, Oxford, UK: BlackwellPublishing Ltd., (2013), 31-39.
Lefevre, Stephanie, "Structure and Appearance Features for Robust 3D Facial Actions Tracking", 2009 IEEE International Conference on Multimedia and Expo, (2009), 298-301.
Li, Yongqiang, "Simultaneous Facial Feature Tracking and Facial Expression Recognition", IEEE Transactions on Image Processing, 22(7), (Jul. 2013), 2559-2573.
Neoh, Hong Shan, "Adaptive Edge Detection for Real-Time Video Processing using FPGAs", Global Signal Processing, vol. 7. No. 3, (2004), 7 pgs.
Phadke, Gargi, "Illumination Invariant Mean-Shift Tracking", 2013 IEEE Workshop on Applications of Computer Vision (WACV), doi: 10.1109 WACV.2013.6475047, (2013), 407-412.
Salmi, Jussi, "Hierarchical grid transformation for image warping in the analysis of two-dimensional electrophoresis gels", Proteomics, 2(11), (2002), 1504-1515.
Su, Zihua, "Statistical Shape Modelling: Automatic Shape Model Building", Submitted to the University College London for the Degree of Doctor of Philosophy, (2011), 238 pgs.
Tchoulack, Stephane, "A Video Stream Processor for Real-time Detection and Correction of Specular Reflections in Endoscopic Images", 2008 Joint 6th International IEEE Northeast Workshop on Circuits and Systems and TAISA Conference, (2008), 49-52.
"U.S. Appl. No. 16/548,279, Notice of Allowance dated Jun. 3, 2022", 31 pgs.
"U.S. Appl. No. 16/548,279, Supplemental Notice of Allowability dated Jun. 15, 2022", 2 pgs.
"U.S. Appl. No. 16/732,858, Notice of Allowance dated May 31, 2022", 12 pgs.
"U.S. Appl. No. 16/732,858, Supplemental Notice of Allowability dated Jun. 17, 2022", 2 pgs.
Chen, Jingying, et al., "Robust Facial Feature Tracking Under Various Illuminations", 2006 International Conference on Image Processing, doi: 10.1109/ICIP.2006.312997., (2006), 2829-2832.

* cited by examiner

METHOD FOR TRIGGERING EVENTS IN A VIDEO

CROSS-REFERENCE TO RELATED APPLICATIONS

This application is a continuation of and claims the benefit of priority of U.S. patent application Ser. No. 16/298,721, filed on Mar. 11, 2019, which is a continuation of and claims the benefit of priority of U.S. patent application Ser. No. 14/314,343, filed on Jun. 25, 2014, which claims the benefit of priority of U.S. Provisional Application Ser. No. 61/936,016, filed on Feb. 28, 2014, each of which are hereby incorporated by reference herein in their entireties.

BACKGROUND OF THE INVENTION

Technical Field

The disclosed embodiments relate generally to the field of real-time video processing. In particular, the disclosed embodiments relate to a computerized system and a computer-implemented method of triggering events in a video.

Description of the Related Art

At the present time some programs can provide processing of still images. For example, U.S. Patent Application Publication No. US2007268312, incorporated herein by reference, discloses a method of replacing face elements by some components that is made by users for real-time video. However, it is not possible to process real time video in such a way that events can be triggered in a real-time vide stream.

Thus, new and improved systems and methods are needed that would enable real time video stream processing that involves triggering events in the video stream.

SUMMARY OF INVENTION

The embodiments described herein are directed to systems and methods that substantially obviate one or more of the above and other problems associated with the conventional technology for real time video stream processing, In accordance with one aspect of the embodiments described herein, there is provided a computer implemented method of triggering events in a video, the method comprising: providing a list comprising a set of objects with their states and a set of events, wherein each object from the set of objects has at least one state triggering at least one event from the set of events in the video; detecting at least one object from the list that at least partially and at least occasionally is presented in frames of the video; tracking the at least one object and its state from frame to frame; and triggering at least one event of the set of events in the video in case the state of the at least one object matches a state from the set of states.

In one or more embodiments, the events the set of events are selected from a group including modification of the at least one object, modification of at least one part of the at least one object, masking of the at least one object, adding at least one new object into the frames of the video, using visual filters for the at least one object, and changing a background of the at least one object.

In one or more embodiments, the at least one event of the set of events is triggered in the video after a time delay.

In one or more embodiments, the computer implemented method further comprises: tracking the at least one object and its state after triggering one event of the set of events in the video; and removing the triggered event from the video in case of detecting change of the state of the at least one object.

In one or more embodiments, the triggered event is removed from the video in case of detecting a state of the at least one object, such that the state of the at least one object corresponds to its pre-triggering state, the pre-triggering state being defined as an average state based on at least one state prior to the state that triggered the event In one or more embodiments, the triggered event is removed from the video in case of detecting change of the state of the at least one object from the current state to another state opposite to the current state.

In one or more embodiments, the computer implemented method further comprises: removing the triggered event from the video after an amount of time.

In one or more embodiments, the objects from the list include a human's face and parts of a human body.

In one or more embodiments, the video comprises a real-time video stream.

In accordance with another aspect of the embodiments described herein, there is provided a computer implemented method of triggering events in a video, the method being performed in connection with a computerized system comprising a processing unit and a memory, the method comprising: providing a list comprising a set of objects with their states and a set of events, wherein each object from the set of objects has at least one state triggering at least one event from the set of events in the video; detecting at least one object from the list that at least partially and at least occasionally is presented in frames of the video; tracking the at least one object and its state; and triggering one random event from the list in video in case the state of the at least one object matches with one of its states from the list.

In accordance with yet another aspect of the embodiments described herein, there is provided a computer implemented method of triggering events in a video which frames comprise images of a user, the method comprising: providing a list comprising a set of pieces of information and a set of events, wherein each piece of information from the set of pieces of information triggers at least one event from the set of events in the video; providing information relating to the user; triggering at least one event from the set of events in video in case the information relating to the user matches with one of the pieces of information from the set of pieces of information.

In accordance with yet another aspect of the embodiments described herein, there is provided a mobile computerized system comprising a central processing unit and a memory, the memory storing instructions for: providing a list comprising a set of objects with their states and a set of events, wherein each object from the set of objects has at least one state triggering at least one event from the set of events in the video; detecting at least one object from the list that at least partially and at least occasionally is presented in frames of the video; tracking the at least one object and its state from frame to frame; and triggering at least one event of the set of events in the video in case the state of the at least one object matches a state from the set of states.

In one or more embodiments, the events the set of events are selected from a group including modification of the at least one object, modification of at least one part of the at least one object, masking of the at least one object, adding at least one new object into the frames of the video, using visual filters for the at least one object, and changing a background of the at least one object.

In one or more embodiments, the at least one event of the set of events is triggered in the video after a time delay.

In one or more embodiments, the memory further stores instructions for: tracking the at least one object and its state after triggering one event of the set of events in the video; and removing the triggered event from the video in case of detecting change of the state of the at least one object.

In one or more embodiments, the triggered event is removed from the video in case of detecting a state of the at least one object, such that the state of the at least one object corresponds to its pre-triggering state, the pre-triggering state being defined as an average state based on at least one state prior to the state that triggered the event.

In one or more embodiments, the triggered event is removed from the video in case of detecting change of the state of the at least one object from the current state to another state opposite to the current state.

In one or more embodiments, the computer implemented method further comprises; removing the triggered event from the video after an amount of time.

BRIEF DESCRIPTION OF DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a computerized system and a computer-implemented method for triggering events in a video.

It will be appreciated that the present method for triggering events is applicable with any kind of video data, e.g. real-time video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data. The techniques described herein can be implemented using any type of computing device including desktops, laptops, tablet computers, mobile phones, music players, multimedia players etc. having any kind of generally used operational system such as Windows®, iOS®, Android® and others. All disclosed embodiments and examples are non-limiting to the invention and disclosed for illustrative purposes only.

Figure 1:
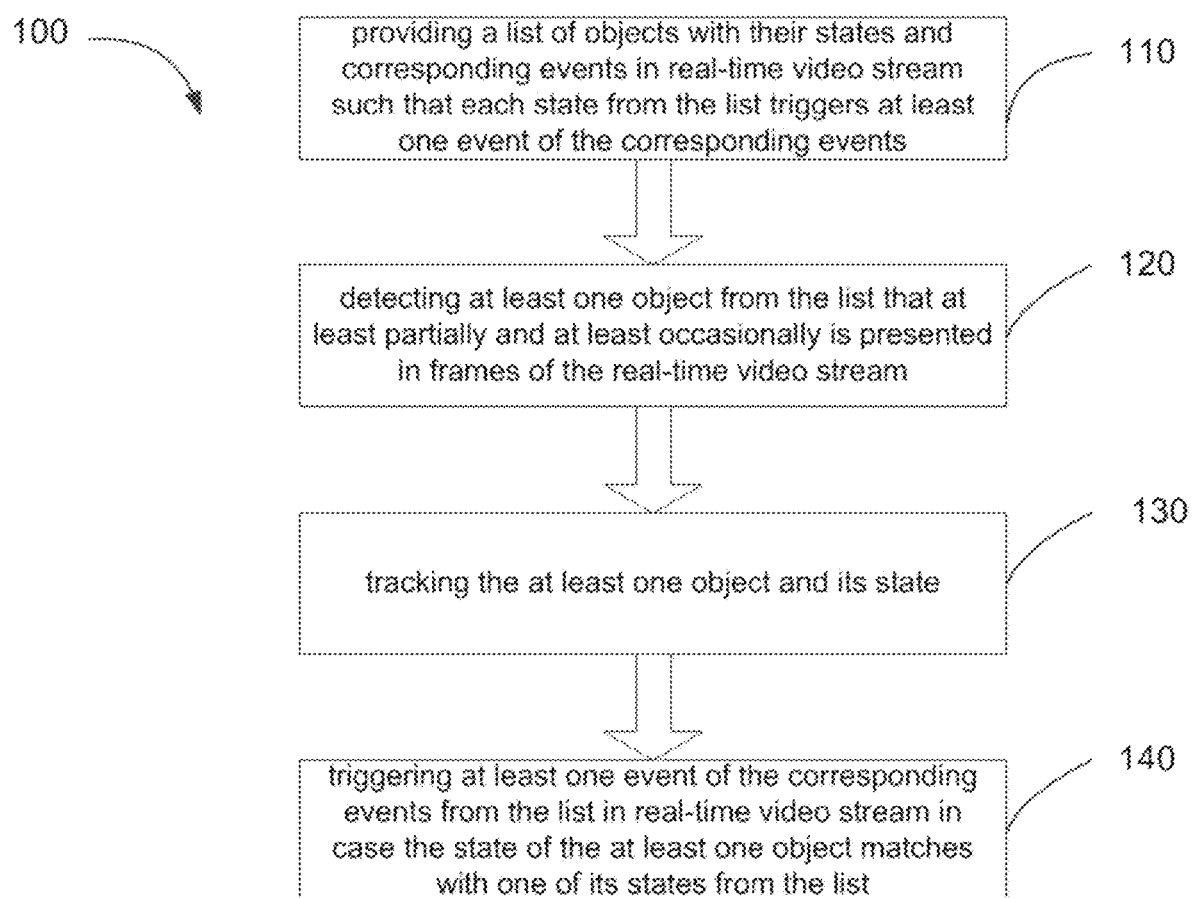
FIG. 1 illustrates a method of a method of triggering events in a video according to the first embodiment of the invention.

The embodiments disclosed further are aimed for processing of real-time video streams, however all other types of video data including video files saved in a memory of a computerized system can be processed by the methods of the present invention. For example, a user can load video files and save them in a memory of his computerized system and such video files can be also processed by the methods of the present invention. An exemplary method 100 according to the first embodiment is illustrated in FIG. 1. The method 100 includes providing a list of objects with theft states and corresponding events in real-time video stream (stage 110). Each state from the list triggers at least one event of the corresponding events, and each object from the list has at least one state triggering at least one event of the corresponding events from the list in real-time video stream. Further, at least one object from the list is detected that at least partially and at least occasionally is presented in frames of the real-time video stream (stage 120) and the at least one object and its state is tracked (stage 130). In case the state of the at least one object matches with one of its states from the list at least one event from the list is triggered in the real-time video stream (stage 140). Triggering of an event can be made immediately or after a time delay.

In one or more embodiments, any kind of events can be triggered in rear time video stream. For example, they can be selected from a group including modification of the at least one object, modification of at least one part of the at least one object, masking of the at least one object, adding at least one new object into the frames of the real-time video stream, using visual filters for the at least one object, and changing a background of the at least one object.

In one or more embodiments, the triggered event can be removed form a real-time video stream after an amount of time or after fulfilling of certain conditions. For example, in some embodiments of the invention the at least one object and its state are tracked after triggering the event from the list, and the triggered event is removed if a change of the state of the object is detected. The change of the state can include returning to original state of the object, or the change of the state can be made to another state opposite to the current state.

For example, in different embodiments of the present invention opening a mouth turns a person to a zombie, closing one eye turns a person to a cat, raising a nose with a finger turns a person to a pig, or showing horns with fingers turns a person to a deer. When mentioned signs are not shown any more a person's image returns to original state.

In one or more embodiments, it is not necessary that triggered events are strictly determined by the objects and their states. For example, in a method 200 according to the second embodiment of the invention (FIG. 1) events for triggering are chosen randomly. More specifically, the method 200 includes providing a list of objects with their states and events in real-time video stream such that each state from the list triggers one of the events from the list (stage 210), detecting at least one object from the list that at least partially and at least occasionally is presented in frames of the real-time video stream (stage 220), tracking the at least one object and its state (stage 230), and triggering one random event from the list in real-time video stream in case the state of the at least one object matches with one of its states from the list (stage 240).

It should be noted that any objects can be processed by the method of the present invention including such objects as a human's face and parts of a human body.

In one or more embodiments, information relating to a user can be used for triggering events in a real-time video stream. A method 300 of triggering events in real-time video stream which frames comprise images of a user according to the first embodiment of the invention is illustrated in FIG. 1. The method 300 includes providing a list of pieces of information and corresponding events in real-time video stream (stage 310) such that each piece of information from the list triggers at least one event of the corresponding events; providing an information relating to the user (stage 320), and triggering at least one event of the corresponding events from the list in real-time video stream in case the information relating to the user matches with one of the pieces of information from the list (330). Information relating to the user can be obtained for the user of from other open sources like social networks.

Face detection and face tracking techniques are discussed in greater detail below.

Face Detection and Initialization

In one or more embodiments, first in the algorithm for changing proportion a user sends a request for changing proportions of an object in a video stream. The next step in the algorithm involves detecting the object in the video stream.

In one or more embodiments, the face is detected on an image with use of Viola-Jones method. Viola-Jones method is a fast and quite accurate method used to detect the face region. Then, an Active Shape Model (ASM) algorithm is applied to the face region of an image to detect facial feature reference points. However, it should be appreciated that other methods and algorithms suitable for face detection can be used.

Figure 2:
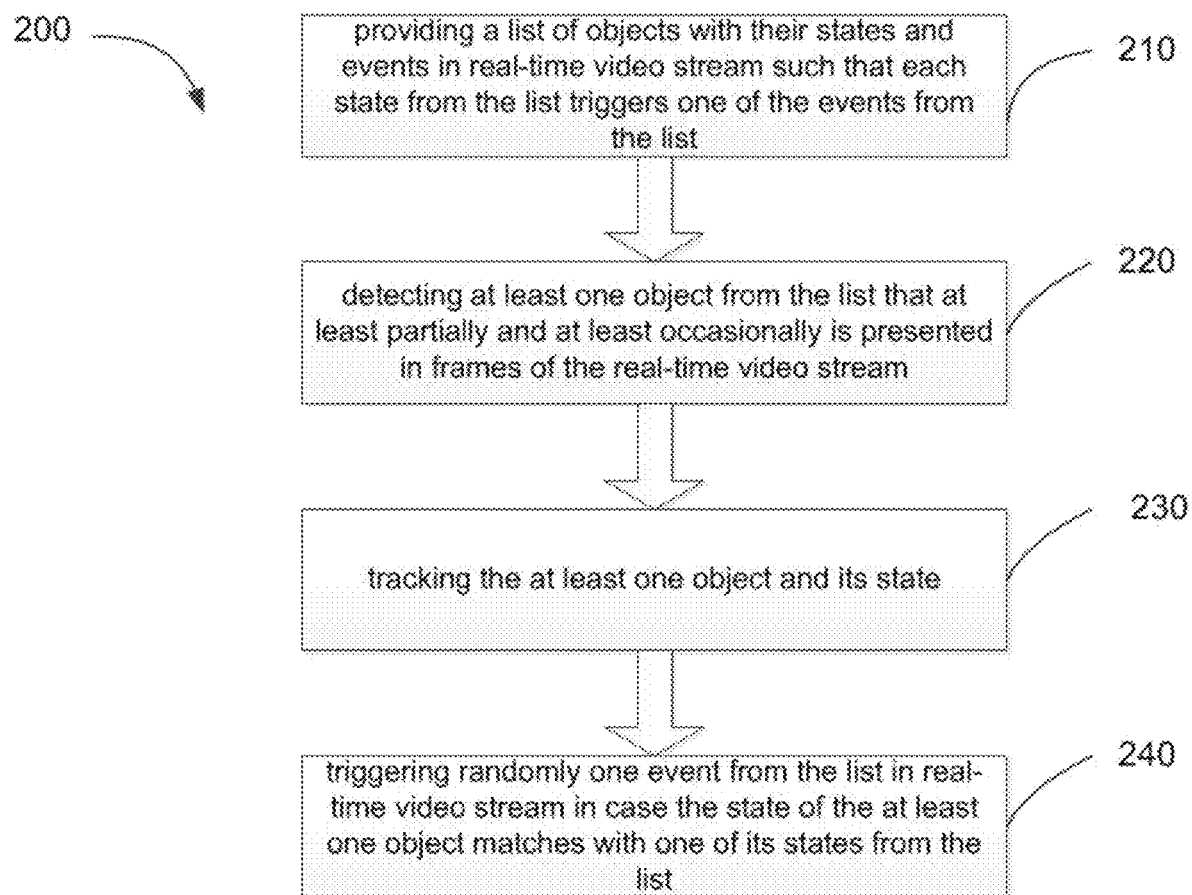
FIG. 2 illustrates a method of a method of triggering events in a video according to the second embodiment of the invention.

In one or more embodiments, for locating facial features locating of landmarks is used. A landmark represents a distinguishable point present in most of the images under consideration, for example, the location of the left eye pupil (FIG. 2).

In one or more embodiments, a set of landmarks forms a shape. Shapes are represented as vectors: all the x-followed by all the y-coordinates of the points in the shape. One shape is aligned to another with a similarity transform (allowing translation, scaling, and rotation) that minimizes the average Euclidean distance between shape points, The mean shape is the mean of the aligned training shapes (which in the present disclosure are manually landmarked faces).

Subsequently, in accordance with the ASM algorithm, the search for landmarks from the mean shape aligned to the position and size of the face determined by a global face detector is started. It then repeats the following two steps until convergence (i) suggest a tentative shape by adjusting the locations of shape points by template matching of the image texture around each point (ii) conform the tentative shape to a global shape model. The individual template matches are unreliable and the shape model pools the results of the weak template matchers to form a stronger overall classifier. The entire search is repeated at each level in an image pyramid, from coarse to fine resolution. It follows that two types of submodel make up the ASM: the profile model and the shape model.

In one or more embodiments, the profile models (one for each landmark at each pyramid level) are used to locate the approximate position of each landmark by template matching. Any template matcher can be used, but the classical ASM forms a fixed-length normalized gradient vector (called the profile) by sampling the image along a line (called the whisker) orthogonal to the shape boundary at the landmark. During training on manually landmarked faces, at each landmark the mean profile vector $\bar{g}$ and the profile covariance atrix Sg are calculated. During searching, the landmark along the whisker to the pixel whose profile g has lowest Mahalanobis distance from the mean profile $\bar{g}$ is displaced, where the $$\text{MahalanobisDistance} = (g-\bar{g})^T S_g^{-1}(g-\bar{g}) \quad (1)$$

In one or more embodiments, the shape model specifies allowable constellations of landmarks. It generates a shape $\hat{x}$ with $$\hat{x} = \bar{x} + \_\_\_\_ b \quad (2)$$

where $\hat{x}$ is the mean shape, is a parameter vector, and is a matrix of selected eigenvectors of the covariance matrix Sg of the points of the aligned training shapes. Using a standard principal components approach, model has as much variation in the training set as it is desired by ordering the eigenvalues λi of Ss and keeping an appropriate number of the corresponding eigenvectors in Φ. In the method, a single shape model for the entire ASM is used but it is scaled for each pyramid level.

Subsequently the Equation 2 is used to generate various shapes by varying the vector parameter b. By keeping the elements of b within limits (determined during model building) it is possible to ensure that generated face shapes are lifelike.

Conversely, given a suggested shape x, it is possible to calculate the parameter b that allows Equation 2 to best approximate x with a model shape x. An iterative algorithm, described by Cootes and Taylor, that gives the b and T that minimizes $$\text{distance}(x, T(\bar{x} + \_\_\_\_ b)) \quad (3)$$

where T is a similarity transform that maps the model space into the image space is used.

In one or more embodiments, mapping can be built from facial feature reference points, detected by ASM, to Candide-3 point, and that gives us Candide-3 points x and y coordinates. Candide is a parameterised face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\sum_{j=1}^{m} X_{ij} * B_j = x_i, \qquad (4)$$

$$\sum_{j=1}^{m} Y_{ij} * B_j = y_i, \qquad (5)$$

where Bj-j-th shape unit, xi, yi i-th point coordinates, Xij, Yij—coefficients, which denote how the i-th point coordinates are changed by j-th shape unit. In this case, this system is over determined, so it cancan be solved precisely. Thus, the following minimization is made:

$$\left(\sum_{j=1}^{m} X_{ij} * B_j - x_i\right)^2 + \left(\sum_{j=1}^{m} Y_{ij} * B_j - y_i\right)^2 \to \min \qquad (6)$$

Let's denote $X=((X_{ij})^T, (Y_{ij})^T)^T$, $x=((x_i)^T, (y_i)^T)^T$, $B=(B_j)^T$. (7)

This equation system is linear, so ifs solution is $$B=(X^T X)^{-1} X^T x \qquad (8)$$

In one or more embodiments, i is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 3:
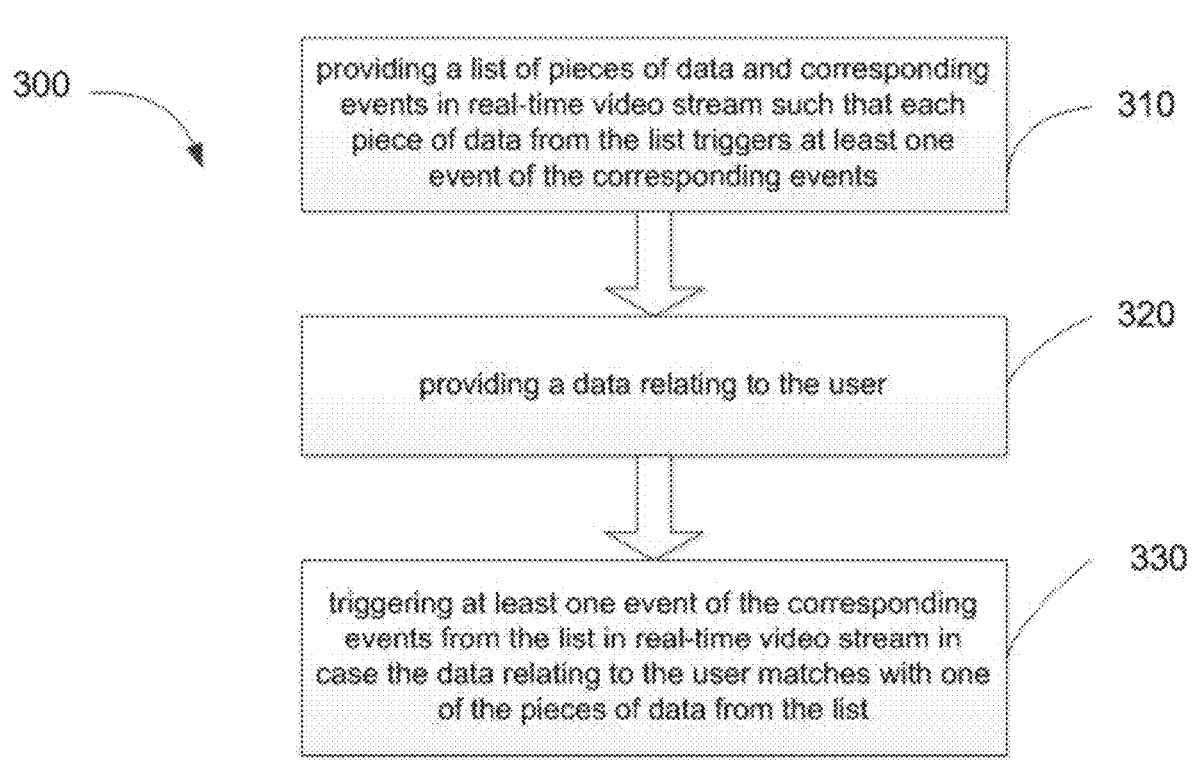
FIG. 3 illustrates a method of a method of triggering events in a video according to the third embodiment of the invention.

In one or more embodiments, the next step comprises tracking the detected object in the video stream. In the present invention the abovementioned Candide-3 model is used (see Ahlberg, J.: Candide-3, an updated parameterized face. Technical report, Linköping University, Sweden (2001)) for tracking face in a video stream. The mesh or mask corresponding to Candide-3 model is shown in FIG. 3.

Figure 4:
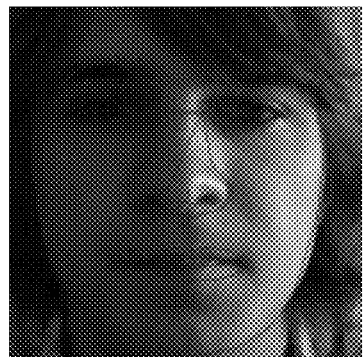
FIG. 4 illustrates facial feature reference points detected by an ASM algorithm used in the method according to one embodiment of the present invention.
Figure 4:
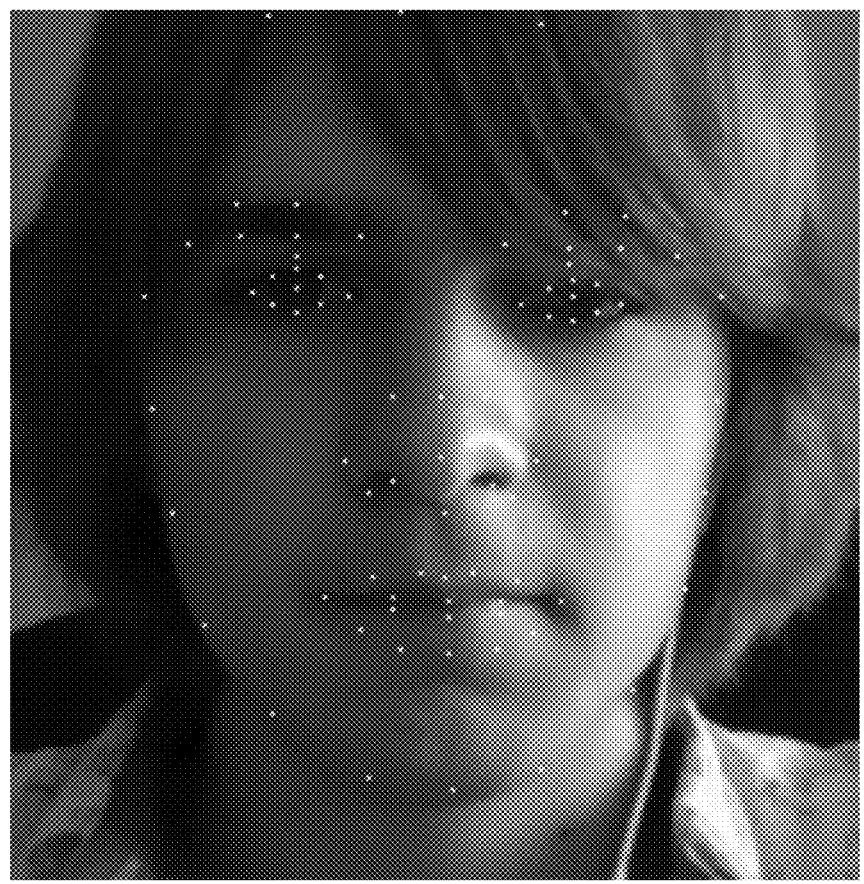
Figure 5:
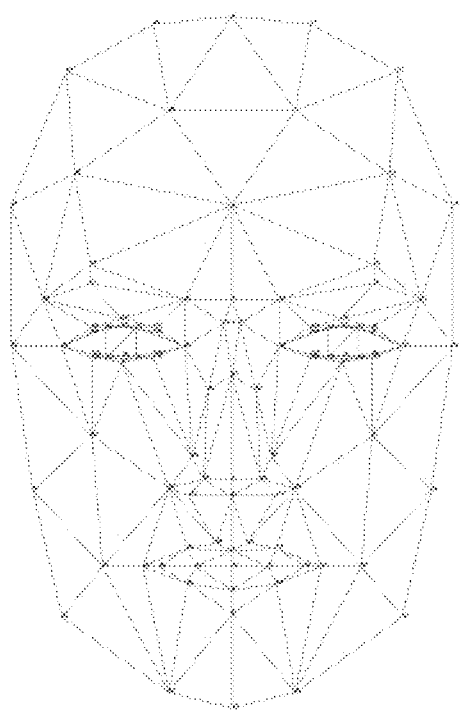
FIG. 5 illustrates Candide-3 model used in the method according to one embodiment of the present invention.
Figure 6A:
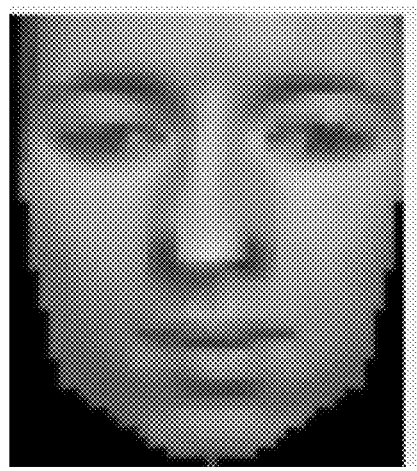
FIG. 6(a) and FIG. 6(b) show an example of a mean face (a) and an example of current observation.
Figure 6B:
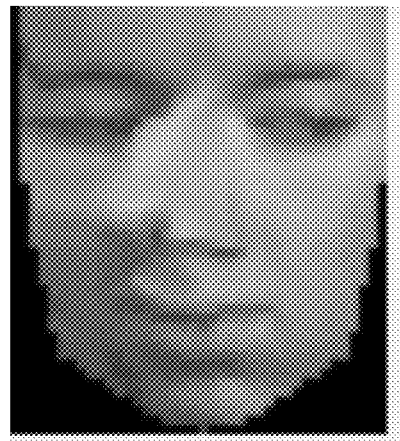
Figure 7:
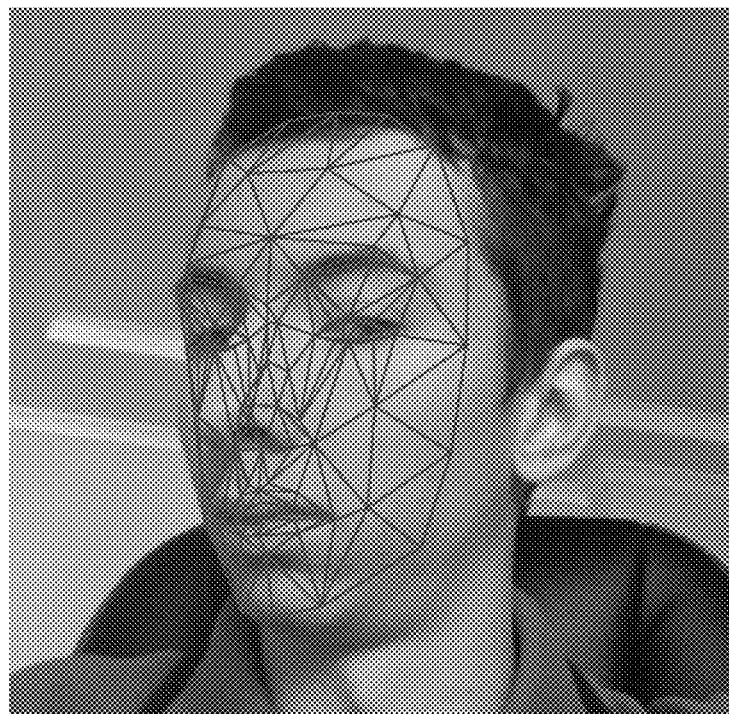
FIG. 7 illustrates Candide at a frame used in the method according to one embodiment of the present invention.

In one or more embodiments, a state of the model can be described by shape units intensity vector, action units intensity vector and a position-vector. Shape units are some main parameters of a head and a face, in the present invention the following 10 units are used:

Eyebrows vertical position
Eyes vertical position
Eyes width
Eyes height
Eye separation distance
Nose vertical position
Nose pointing up
Mouth vertical position
Mouth width
Chin width In one or more embodiments, action units are face parameters that correspond to some face movement. In the present invention the following 7 units are used:

Upper lip raiser
Jaw drop
Lip stretcher
Left brow lowerer
Right brow lowerer
Lip corner depressor
Outer brow raiser In one or more embodiments, the mask position at a picture can be described using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16(9):1107-1124 (2006)) is to find the mask position, which observes the region most likely to be a face. For each position it is possible to calculate observation error—the value which indicates the difference between image under current mask position and the mean face. An example of the mean face and of the observation under current position is illustrated in FIGS. 4(a)-3(b). FIG. 4(b) corresponds to the observation under the mask shown in FIG. 5.

In one or more embodiments, a face is modeled as a picture with a fixed size (width=40 px, height=46 px) called a mean face. Gaussian distribution that proposed in original algorithms has shown worse result in compare with static image. So the difference between current observation and a mean face is calculated in the following way:

$$e(b)=\Sigma \log(1+I_m)-\log(1+I_i))^2 \qquad (9)$$

Logarithm function makes tracking more stable.

In one or more embodiments, to minimize error Taylor series is used as it was proposed by Dornaika at. el(see F. Dornaika, F. Davoine, On appearance based face and facial action tracking, in IEEE Transactions on Circuits and Systems for Video Technology, 16(9), September, 2006, p. 1107-1124). It was found that it is not necessary to sum up a number of finite difference when calculating an approximation to first derivative. Derivative is calculated in the following way:

$$g_{ij} = \frac{w(y_t, b_t + \_b_t)_{ij} - w(y_t, b_t - \_b_t)_{ij}}{-j} \qquad (10)$$

Here $g_{ij}$ is an element of matrix G. This matrix has size m*n, where m is large enough (about 1600) and n is small (about 14). In case of straight-forward calculating there have to be done n*m operations of division. To reduce the number of divisions this matrix can be rewritten as a product of two matrices:

$$G=A*B$$

Where matrix A has the same size as G and its element is:

$$a_{ij}=W(y_t, b_t+\_\_\_\_\_ b_t)_{ij}-W(y_t, b_t-\_\_\_\_\_ b_i)_{ij} \qquad (11)$$

and matrix B is a diagonal matrix with sizes n*n, and $b_{ii}=\_i^{-1}$

Now Matrix $G_t^+$ has to be obtained and here is a place where a number of divisions can be reduced.

$$G_t^+=(G^T G)^{-1} G^T=(B^T A^T A B)^{-1} B^T A^T=B^{-1}(A^T A)^{-1} B^{-1}$$
$$BA^T=B^{-1}(A^T A)^{-1T} \qquad (12)$$

After that transformation this can be done with n*n divisions instead of m*n.

One more optimization was used here. If matrix $G_t^+$ is created and then multiplied to $\square_{b_t}$, it leads to n²m operations, but if first $A^T$ and $\square_{b_t}$ are multiplied and then $B^{-1}$ $(A^T A)^{-1}$ with it, there will be only n*m+n³ operations, that is much better because n«m.

Thus, the step of tracking the detected object in the video stream in the present embodiment comprises creating a mesh that is based on the detected feature reference points of the object and aligning the mesh to the object on each frame.

It should be also noted that to increase tracking speed in the present invention multiplication of matrices is performed in such a way, that it can be boosted using ARM advanced SIMD extensions (also known as NEON). Also, the GPU is used instead of CPU whenever possible. To get high performance of the GPU, operations in the present invention are grouped in a special way.

Thus, exemplary embodiment of the tracking technique described herein has the following advantageous features:
1. Before tracking Logarithm is applied to the grayscale value of each pixel to track it. This transformation has a great impact to tracking performance.
2. In the procedure of gradient matrix creation, the step of each parameter depends on the scale of the mask.

Exemplary Computer Platform

Figure 8:
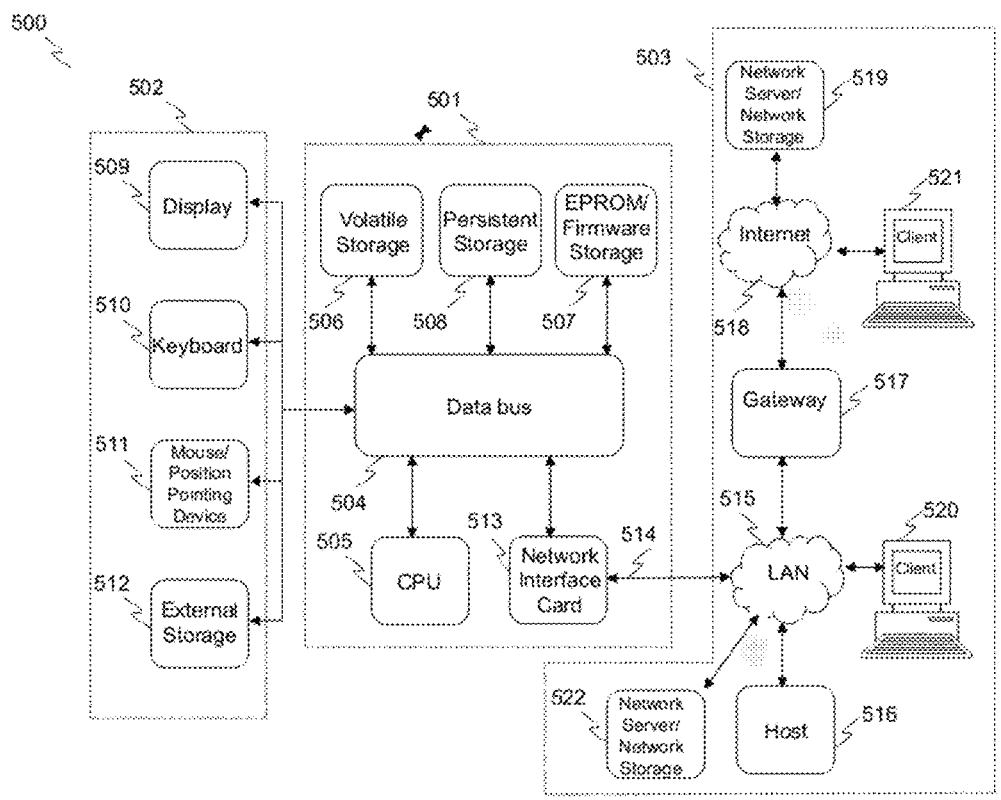
FIG. 8 illustrates an exemplary embodiment of a computer platform based on which the techniques described herein may be implemented.

FIG. 8 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505, Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein, Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic edium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515, For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522. Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video stream processing. It is intended that the specification and examples be considered as exemplary only, with a true scope and spirit of the invention being indicated by the following claims.

What is claimed is:

1. A computer-implemented method comprising:
   detecting, by a processor, a first object within frames of a video;
   determining that the first object performs a first gesture;
   based on determining that the first object performs the first gesture, selecting a first virtual animal of a plurality of virtual animals as a visualization;
   adding the visualization comprising the first virtual animal as a new object into the frames of the video;
   determining that the first object performs a second gesture after the visualization comprising the first virtual animal has been added into the frames of the video;
   based on determining that the first object performs the second gesture, selecting a second virtual animal of the plurality of virtual animals as the visualization; and
   changing the visualization comprising the first virtual animal to the visualization comprising the second virtual animal responsive to determining that the first object performs the second gesture after the visualization comprising the first virtual animal has been added into the frames of the video.

2. The computer-implemented method of claim 1, further comprising:
   detecting, by the processor, physical displacement of a first portion of the first object relative to a second portion of the first object across the frames of the video; and
   selecting a virtual animal from the plurality of virtual animals based on a type of gesture performed by the first object corresponding to the physical displacement.

3. The computer-implemented method of claim 1, further comprising:
   providing a list comprising a set of objects, a set of object states associated with the set of objects, and a set of events, wherein the set of objects are associated with one or more images of a user and each object from the set of objects has at least one object state triggering at least one event from the set of events in the video and each object state is associated with at least one point of the object of the set of objects, wherein the first object is in the list;
   tracking the first object across two or more frames of the video, the first object having a first object state;
   identifying a change in the first object state of the first object to a second object state;
   determining that the second object state of the first object matches a state from the set of object states; and
   in response to determining the match, triggering at least one event of the set of events in the video.

4. The computer-implemented method of claim 3 further comprising:
   detecting a face of the user within the frames of the video, the face including a set of landmark points corresponding to facial features; and
   aligning a mesh with the face of the user, the mesh containing a set of feature reference points, each feature reference point corresponding to a landmark point of the set of landmark points, wherein the second object state comprises a facial gesture, wherein the change from the first object state to the second object state corresponds to movement of a first portion of landmark points relative to one or more feature reference points of the mesh, indicating movement of the first portion of landmark points on the face of the user, while a second portion of landmark points remains aligned with corresponding feature reference points of the mesh.

5. The computer-implemented method of claim 1, further comprising:
determining that the first gesture corresponds to one of a plurality of eyes of the first object being closed.

6. The computer-implemented method of claim 1, wherein the visualization is added after a time delay from when a first portion of the first object is physically displaced relative to a second portion of the first object, and wherein the visualization is removed from the video in case of detecting a state of the first object, such that the state of the first object corresponds to an average state of the first object based on at least one state prior to a physical displacement that triggered replacement of the at least the portion of the first object.

7. The computer-implemented method of claim 1, wherein the visualization is selected at random from the plurality of visualizations, and wherein the visualization is removed from the video in case of detecting change of a state of the first object from a current state to another state opposite to the current state.

8. The computer-implemented method of claim 1, further comprising:
determining that the first gesture corresponds to raising a nose of the first object with a finger;
selecting a virtual pig as the virtual animal in response to determining that the first gesture corresponds to raising the nose of the first object with the finger; and
turning the first object into the virtual pig in the frames of the video in response to determining that the first gesture corresponds to raising the nose of the first object with the finger.

9. The computer-implemented method of claim 1, further comprising:
determining that the first gesture corresponds to showing horns on the first object with fingers;
selecting a virtual deer as the virtual animal in response to determining that the first gesture corresponds to showing horns on the first object with fingers; and
turning the first object into the virtual deer in the frames of the video in response to determining that the first gesture corresponds to showing horns on the first object with fingers.

10. The computer-implemented method of claim 1, wherein the video comprises a real-time video stream, wherein detecting the first gesture comprises detecting that a first facial portion has been moved relative to a second facial portion, wherein the visualization comprises a first visualization corresponding to physical displacement of the first facial portion relative to the second facial portion, and wherein a second visualization of the plurality of visualization corresponds to physical displacement of a third facial portion relative to the second facial portion.

11. A system, comprising:
one or more processors of a mobile computing device; and
a non-transitory processor-readable storage medium storing processor executable instructions that, when executed by the one or more processors, cause the one or more processors to perform operations comprising:
detecting a first object within frames of a video;
determining that the first object performs a first gesture;
based on determining that the first object performs the first gesture, selecting a first virtual animal of a plurality of virtual animals as a visualization;
adding the visualization comprising the first virtual animal as a new object into the frames of the video;
determining that the first object performs a second gesture after the visualizationcomprising the first virtual animal has been added into the frames of the video;
based on determining that the first object performs the second gesture, selecting a second virtual animal of the plurality of virtual animals as the visualization; and
changing the visualization comprising the first virtual animal to the visualization comprising the second virtual animal responsive to determining that the first object performs the second gesture after the visualization comprising the first virtual animal has been added into the frames of the video.

12. The method of claim 5, wherein the first virtual animal comprises a virtual cat, further comprising turning the first object into the virtual cat in the frames of the video in response to determining that the first gesture corresponds to one of a plurality of eyes of the first object being closed.

13. The system of claim 11, wherein the operations further comprise:
providing a list comprising a set of objects, a set of object states associated with the set of objects, and a set of events, wherein the set of objects are associated with one or more images of a user and each object from the set of objects has at least one object state triggering at least one event from the set of events in the video and each object state is associated with at least one point of the object of the set of objects, wherein the first object is in the list;
tracking the first object across two or more frames of the video, the first object having a first object state;
identifying a change in the first object state of the first object to a second object state;
determining that the second object state of the first object matches a state from the set of object states; and
in response to determining the match, triggering at least one event of the set of events in the video.

14. The system of claim 13, wherein the operations further comprise:
detecting a face of the user within the frames of the video, the face including a set of landmark points corresponding to facial features; and
aligning a mesh with the face of the user, the mesh containing a set of feature reference points, each feature reference point corresponding to a landmark point of the set of landmark points, wherein the second object state comprises a facial gesture, wherein the change from the first object state to the second object state corresponds to movement of a first portion of landmark points relative to one or more feature reference points of the mesh, indicating movement of the first portion of landmark points on the face of the user, while a second portion of landmark points remains aligned with corresponding feature reference points of the mesh.

15. The system of claim 11, wherein the operations further comprise:
determining that the first gesture corresponds to one of a plurality of eyes of the first object being closed;

selecting a virtual cat as the virtual animal in response to determining that the first gesture corresponds to one of a plurality of eyes of the first object being closed; and turning the first object into the virtual cat in the frames of the video in response to determining that the first gesture corresponds to one of a plurality of eyes of the first object being closed.

16. The system of claim 11, wherein the visualization is added after a time delay from when a first portion of the first object is physically displaced relative to a second portion of the first object, and wherein the visualization is removed from the video in case of detecting a state of the first object, such that the state of the first object corresponds to an average state of the first object based on at least one state prior to a physical displacement that triggered replacement of the at least the portion of the first object.

17. The system of claim 11, wherein the operations further comprise:

determining that the first gesture corresponds to raising a nose of the first object with a finger; and selecting the first virtual animal in response to determining that the first gesture corresponds to raising the nose of the first object with the finger.

18. The system of claim 17, wherein the first virtual animal comprises a virtual pig, and wherein the operations further comprise turning the first object into the virtual pig in the frames of the video in response to determining that the first gesture corresponds to raising the nose of the first object with the finger.

19. The system of claim 11, wherein the operations further comprise:

determining that the first gesture corresponds to showing horns on the first object with fingers; and selecting the first virtual in response to determining that the first gesture corresponds to showing horns on the first object with fingers.

20. A non-transitory processor-readable storage medium storing processor executable instructions that, when executed by a processor of a machine, cause the machine to perform operations comprising:

detecting a first object within frames of a video;

determining that the first object performs a first gesture;

based on determining that the first object performs the first gesture, selecting a first virtual animal of a plurality of virtual animals as a visualization;

adding the visualization comprising the first virtual animal as a new object into the frames of the video;

determining that the first object performs a second gesture after the visualization comprising the first virtual animal has been added into the frames of the video;

based on determining that the first object performs the second gesture, selecting a second virtual animal of the plurality of virtual animals as the visualization; and changing the visualization comprising the first virtual animal to the visualization comprising the second virtual animal responsive to determining that the first object performs the second gesture after the visualization comprising the first virtual animal has been added into the frames of the video.

* * * * *